Nov. 24, 1953

T. VON HAUTEVILLE 2,660,660

ARRANGEMENT OF ELECTRODES FOR DIELECTRIC RADIO-FREQUENCY
HEATING OF NONCONDUCTORS, FOR EXAMPLE
THERMOPLASTIC MATERIALS

Filed Jan. 26, 1950

INVENTOR.
TANKRED VON HAUTEVILLE
BY R. P. Morris

ATTORNEY

Patented Nov. 24, 1953

2,660,660

UNITED STATES PATENT OFFICE 2,660,660

ARRANGEMENT OF ELECTRODES FOR DI-ELECTRIC RADIO-FREQUENCY HEATING OF NONCONDUCTORS, FOR EXAMPLE, THERMOPLASTIC MATERIALS

Tankred von Hauteville, Stuttgart, Wurttemberg, Germany, assignor to International Standard Electric Corporation, New York, N. Y., a corporation of Delaware Application January 26, 1950, Serial No. 140,712

Claims priority, application Germany January 29, 1949

5 Claims. (Cl. 219—47)

The method of dielectric R.-F. heating of nonconductors for the purpose of heat treatment or heat processing by means of alternating fields of preferably very high frequency is well known and in the future its extent and importance will even be increased. From an economic point of view the most important application of the named method besides electro-medicine seems to be the heat processing of thermoplastic materials (deformation, coining, welding etc.).

For this important field of application in particular innumerable arrangements and methods have already been suggested which are being applied for the most different purposes. In many cases considerable difficulties were caused by the fact that the electrodes used cannot be manufactured in the requested optimal form. This becomes true, for instance, if one of the two electrodes cannot be supplied with power at all or only in a very complicated way. The constant endeavours to combine in one operation a number of operations so far also has not led to a satisfactory solution in all cases.

The present invention deals with an arrangement which in many cases can be of extreme importance as will be seen from the further description.

In accordance with the invention it is proposed that the distance between the effective electrodes for the dielectric R.-F. heating of non-conductors for the purpose of heat-treatment or heat processing will be divided into a series connection of at least two capacitances of equal or different size. The field of application of this invention preferably includes the field of heat processing of thermoplastic materials. It is, however, by no means restricted to it.

The invention is further described hereinafter with reference, by way of example, to the accompanying drawings, in which:

Fig. 5 is a view in cross-section showing a form of intermediary electrode used in seaming material into tubing and the like.

Figure 1:
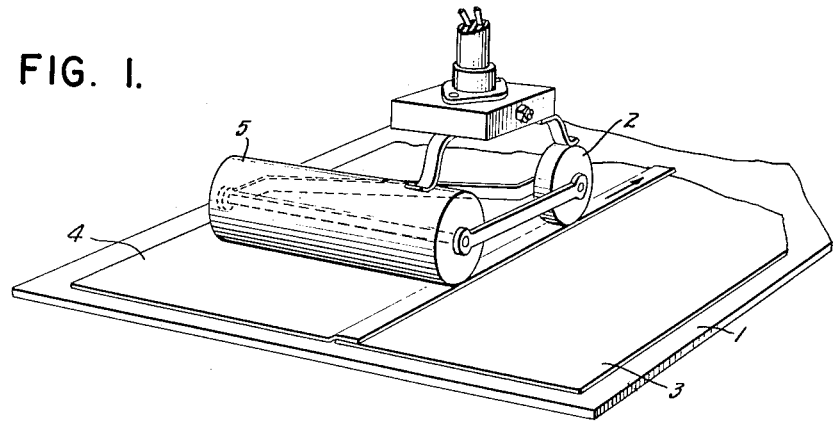
Fig. 1 is a diagrammatic view in perspective of one form of the invention.

The scheme in Fig. 1 of the drawing is an example of the specific application of the invention. Here a hand-tool for the welding or cutting of plastic foils is described, by means of which, for example two overlapping foils 3 and 4 of thermoplastic material can be welded together on a metallic platen 1 by a roller electrode 2. The special advantage of this arrangement lies in the fact that the R.-F. energy is not directly supplied to the counter-electrode of the roller electrode 2, the metallic platen 1, but by capacitance over a second roller electrode 5, the extent (width) of which is appreciably larger than that of the electrode 2. The capacitance between the electrode 5 and the metallic platen 1 is thus considerably larger than that between the electrode 2 and the platen 1 so that no heating at all or only an insignificant heating of the material takes place, when the power is supplied for welding of the foils between the electrode 2 and the metallic platen 1. Should the metallic platen be directly connected with the outlet of the R.-F. generator it should be of relatively small dimensions in order to prevent an unequal potential distribution. In this case also limits would be imposed on the length of the R.-F. supply leads for reasons of voltage distribution.

The advantage of the arrangement of Fig. 1 thus lies in the fact that it allows a clearcut match of the working circuit proper to the possibly shielded supply cable and that no limit is imposed on the length of the latter. The preferably metallic working platen no longer serves as an opposite electrode to return the circuit to the generator but acts as a common opposed electrode to the working and the return electrodes. This does away with all limits on the size of the supporting plate. Both electrodes are suitably mounted and shaped and by way of example, are manually carried along on the material being processed. The overall voltage applied and the capacitance of the actual working and the return electrodes to the metallic supporting platen are so regulated that such power density as is required for dielectric heating will only occur below the working electrode. This, as mentioned before, is achieved by making the capacitance of the return electrode $G_R$ against the metallic (intermediate electrode) appreciably larger than that of the working electrode $C_A$ against the supporting platen. The heating power under the respective electrodes is inversely proportional to their capacitances; since the capacitances or loss resistances, respectively, are proportional to the area of the platen covered by the electrodes, the proportion of the power density below the working electrode to the power density below the return electrodes is found to be $$N_A = \left(\frac{C_R}{C_A}\right)^2 \cdot N_R$$

This capacitance ratio can be achieved e. g. by shaping the working electrode as a rather narrow roller while the return electrode should be relatively wide.

Even if the shafts of the two rollers are arranged in such way as to be moved towards each other it may be required at times to replace the actual working roller by a ball, thus giving freedom of motion in all directions to permit even curved seams of high curvature to be made. In order to increase the flexibility also of the large return electrode it may be found advantageous to prepare it as a metallic plate of relatively large size which, supported on balls, is moved along over the material with the least separation. This will also guarantee an unvarying separation of the return electrode from the goods to be processed. If the working electrode is designed as a roller it will be preferable not to expose the material heated in the R.-F. field to additional mechanical stress at the same place by excessive roller pressure. This is prevented by providing the roller with end discs of insulating material or with guiding rollers of insulating material arranged at either side of, and close to the working electrode.

If the device is intended for the use of foil cutting, it is preferred to make the working electrode narrow enough or to provide it with a sharp rim.

To allow operation at varying rates of feed the device of this invention is equipped with a control unit regulating automatically the power of the R.-F. generator according to the operating speed or the thickness of the material, respectively. Also provided is a device for tuning the working circuit proper, formed by the electrodes.

Another very important field of application for the invention lies in the welding of stacks of foils, and especially, where only some of them should be welded together in the R.-F. field.

Pockets put on lined brief-cases, for example, partitioned pockets and similar items where partial seams are involved, can of course be made by sub-assembly-welding in a sequence of working operations. The manufacture in one operation would be desirable to a high degree for reasons of economy and operational efficiency.

A problem is present when a working piece is to be turned up after welding in order to weld off the turned-up seams. If, for example, the sleeve of a raincoat had initially been simply welded and then turned up in order to afterwards weld the turned-down edges of the seam, the application of rather elaborate equipment—such as a roller electrode mounted on an arbor— has heretofore been required; this, however, more or less limits the length of the welding seams.

A similar problem exists in welding the longitudinal seam of stockings.

Such prior methods fail with tubing diameters less than the required diameter of the arbor, and with tubing of rather considerable length.

Even with the welding press, trouble had been encountered with difficult problems of this kind. The opposite electrode had to have free passage and could not be held at its ends only. The independent electrode had to be of adequate stability and wide enough to accommodate between its supports all of the length of the tubing operated on.

These conditions, as delineated above, can be avoided by adopting the idea of this invention which permits predetermined foils inside a stock of foils to be welded to each other by using separating layers, preferably of metal, which will prevent the welding of those foils which are to be left unwelded.

The effect of these interlayers may be different. Primarily, however, the idea is to subdivide, by at least one intermediate layer of the kind mentioned, the distance between the welding electrodes into a series connection of capacitances of differing sizes, the smallest of which serve(s) for welding purposes.

Figure 2:
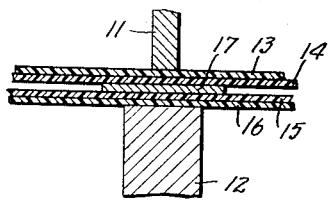
Fig. 2 is a view in cross-section of the terminals with foils of material to be heat processed shown disposed between the terminals.

A simple example of this kind is given in Fig. 2 where only two out of four foils are to be welded together. Between the two electrodes 11 and 12 such as roller electrodes, differing in width four foils 13, 14, 15, and 16 of thermoplastic material are interposed. The interlayer 17 is here inserted between the foils 14 and 15. The capacitance between 12 and 17 exceeds that between 11 and 17. With correct R.-F. dosage, foils 13 and 14 will thus weld to each other, while the foils 15 and 16 are not heated sufficiently to effect the welding.

The shape of the interlayers may in each case be widely adapted to the purpose of application. In many cases it will be preferable to design them as a metallic foil strip, the thickness of which may be quite insignificant. The width of same, however, must in this case exceed that of the welding seam.

Figure 3:
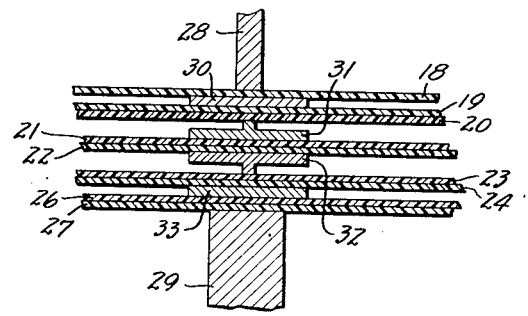
Fig. 3 shows in cross-section a plurality of electrodes arranged for welding certain foils of a stack of foils.

It has proved to be especially useful to adopt an interlayer of a trapezoid or T-shaped cross-section, the narrow face of which matches the width of the seam to be welded. Fig. 3 illustrates an application of such interlayers where partial weldings are being carried out within a stack of foils. The nine foils 18 through 27 are arranged between the electrodes 28 and 29. Between the foils 18 and 19, 20 and 21, 22 and 23, as well as 24 and 25 interlayers of a band-shape 30 through 33 are arranged of which 31 and 32 feature the described T-shape. The narrow faces of these two interlayers correspond to the width of the welding seam required. The lowest capacitances within this stack occur between interlayers 30 and 31 as well as 32 and 33, thus only foils 19 and 20, and foils 23 and 24 are welded to each other.

Figure 4:
Fig. 4 is a view in cross-section of one of the intermediary electrodes of Fig. 3 provided with lateral guiding pins or ledges for guiding adjacent foils.

To ensure correct orientation of the interlayers of a T-shaped or trapezoid cross-section, they may be provided also with lateral guiding pins or ledges 34 of some appropriate material according to Fig. 4. If these pins or ledges are of metal, they must of course not be in juxtaposition with an opposite metallic electrode of the same width as the intermediary electrode, according to Fig. 4.

To facilitate correct stacking of the several intermediary electrodes and to prevent them from slipping, these may be of magnetic material with high retentivity and permanence.

All of the described methods are suitable for the welding press as well as for use between roller electrodes serving for the purpose of R.-F. welding.

Figure 5:
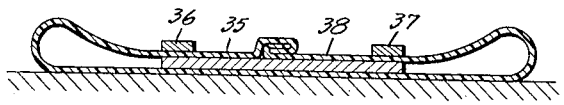

In this connection an especially suitable arrangement should be pointed out which is illustrated in a schematical manner in Figure 5. It is particularly useful for the welding of foils into tubing of limited length, for example, the sleeves of raincoats from foils of thermoplastic materials. The interlayer 35 (Fig. 5) will protrude from both ends of the tubing in this process. Ledges 36 and 37 are fixed to these ends, by clamps for instance, and will serve on the one hand for positioning the welding material 38 and on the other hand for guiding of the guiding rollers attached to the machine thus offering facilities for welding a very clean and straight seam.

Finally, the problem of welding tubular foils of thermoplastic material has to be pointed out. Such rigid and flexible tubing is used to a large extent in the chemical and food-processing industries since certain grades of thermoplastic material demonstrate very favorable properties regarding the stability against chemical influences, especially against acids. Their scope of application is, however, by no means limited to these industries. In electrical engineering, for example such rigid and flexible tubing is being used for insulating purposes.

The joining of rigid and flexible tubing, and of long hollow bodies in general, had so far been performed by welding the ends together, with the material brought to a plastic state by hot-air heating, with or without a cord of the same thermoplastic material being interposed.

This method, however, requires a large amount of care and time and can be practiced only with very much trouble particularly in case the conduits are mounted permanently without access from all sides. In this process the tubes have to be widened, or sockets have to be slipped on. Also, it can only be practiced if the thickness of the material exceeds a certain minimum which is usually the case with insulating sleeves. In actual practice, thin foils of thermoplastics cannot be brought to the soft plastic state required for welding, without detrimental effects on their shape and structural form, because of their softness and because of the difficulty of obtaining by outside heat a uniform distribution of temperature throughout the object on hand.

These drawbacks can be eliminated by using the method of this invention which is appropriate for all types of hollow bodies (hoses, tubing, rods, etc.) of thermoplastic materials, independent of their cross-sections; it is adequate even if the hollow body is filled with metal or non-conductors with A.-C. conductivities smaller or greater than that of the thermoplast. In this case the procedure is to bring the thermoplastic material to welding temperature by dielectric heating by means of R.-F. energy which is supplied by electrodes of a shape adapted to the case at hand, and if possible, to weld the material by pressure at the same time. These processes can be combined in one working operation.

Figure 6:
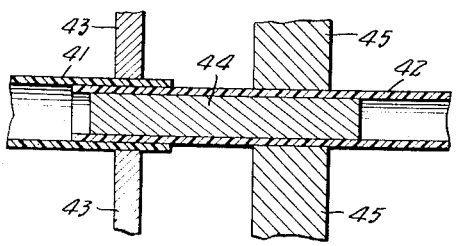
Fig. 6 is a view in cross-section of a form of terminals provided for welding tubular material together.

A possible design of the devices operating on the first principle is laid down schematically in Fig. 6. The flexible tubing units 41 and 42 of thermoplastic material to be welded together are surrounded by a compressible annular electrode 43 which should be composed of at least two parts, while an intermediary electrode 44, which can of course also be of annular shape, is in the interior.

The two- or multi-section annular electrode 43 is so shaped that when operated from outside it presses the outer tubing on the inner tubing concentrically, and the latter in turn presses on the inner electrode. Thus the lateral flowing of the thermoplastic material required for a perfect weld is effected. In this operation it is not necessary to connect the inner electrode 44 with the generator directly which, especially with regard to long hoses would involve considerable difficulties.

The intermediary electrode is made relatively long instead, and has a second concentric and likewise two- or multi-sectional annular electrode 45 which is so shaped that its relative capacitance with regard to the inner electrode 44 is several times the capacitance of the welding electrode 43 to the inner electrode 44. In this manner, power is supplied to the inner electrode 44 capacitively, if the outer electrodes 43 and 45 are wired to the welding current source. As these capacitances differ a great deal in size most of the R.-F. power is dissipated between the electrodes 43 and 44 and so the material is raised to welding temperature while the power dissipated between the electrodes 44 and 45 is not sufficient for adequate heating of the material. Of course, also both of the outer electrodes may be of equal width so that two annular welding seams are performed simultaneously. This is of special advantage if the hoses are to be joined by means of a socket.

Experience, however, reveals that even the insertion in the tubing of the inner electrode may cause considerable difficulties in certain cases. Therefore it is furthermore suggested to design it as a thin conducting foil, or even as a metallic coating on the interior of the innertubing. One might also use as an inner electrode some material of suitable high R.-F. conductivity. In this case the inner electrode is so designed that it can easily be drawn out from the open end of the tubing.

More convenient still is the operation of the device if the inner electrode is made of a material which can be washed out by liquids or which can be removed in some other way, for example, by heat. In this way for instance sugar, salt, or other soluble substances may be used as carriers for the inner electrode, if they are intermixed with an electric conductor or coated with a conducting layer.

With this last-named method the supporting effect can be accomplished by a liquid inside the rigid or flexible tubing or by some gas, either of them under a slight overpressure. If a liquid is used for this purpose it may act as an inner electrode itself if it conducts high frequency power well enough such as is the case, for example, with glycerine. Frequently viscous or pulpy substances are even more suitable for such ends.

With thermoplast-insulated wires the wire proper is used as an inner electrode coupled capacitively to the generator output terminals.

It may be mentioned at this point that the welding electrode 43 (Fig. 6) may also be designed as an inflated annular electrode which is either made of conducting material, or is filled with such material, or is coated with a strip of conducting foil at the welding place. The welding operation is then carried out in such way that this electrode is first inflated by liquid or gas pressure to an extent that it slides easily over the tubing to be joined and that after at least part of its gaseous or liquid contents has been removed it bears upon the place to be welded with adequate pressure.

Frequently it may be the case that the high frequency potential of an intermediary electrode is bound to some potential, mostly the earth potential, by some, mostly capacitive by-pass. In this case it is recommended that the R.-F. power to the electrodes be supplied in such way (e. g. symmetrically) that apart from this the potential of the intermediary electrode is tied to this fixed value (preferably the earth potential).

The above examples represent only a small part of the possibilities of application of the invention. Essentially, they deal with the welding of thermoplastic materials. Equally favorable arrangements can be achieved when applying the invention to other technical fields, for example, in the process of gelatinating of plastics, especially progressive gelatinating; in the dielectric R.-F. heating of food-stuffs, in vulcanization of rubber or rubber-like substances, and in other technical or chemo-technical processes.

I claim:

1. An arrangement of electrodes for dielectric heating of non-conductors comprising a plurality of T-shaped electrodes to which R.-F. energy may be applied, the electrodes having co-active surfaces which define spaces therebetween for material to be heat-processed, the co-active surfaces of the electrodes for one of said spaces being much greater in area than the co-active surfaces of the electrodes defining another of said spaces, at least a pair of said electrodes being positioned back-to-back in respect to the co-active surfaces thereof, said T-shaped electrodes including lateral foil guiding projections of dielectric material disposed at the ends of the T substantially parallel to the stem of the T.

2. An arrangement of electrodes for dielectric heating of thermoplastic material comprising a pair of spaced electrodes at least one intermediate electrode adapted to be maintained insulated from said spaced electrodes by intervening thermoplastic work material, said intermediate electrode including a thickened rib-like portion for contacting engagement with work material and concentration of heat from high frequency energy applied to said spaced electrodes to a portion of said work material immediately adjacent said rib-like electrode portion, said intermediate electrode being of material having properties of magnetic permeability.

3. An arrangement of electrodes for dielectric heating of non-conductors comprising a plurality of electrodes arranged in the form of a pile and separated by work material to be heated, means for the application of high frequency electrical energy to the outermost of said electrodes, at least one of said intermediate electrodes being provided with integral rib-like portions for contacting engagement with work material while maintaining portions thereof spaced from said work material, whereby upon application of electrical energy to the outermost electrodes of said arrangement heating of said work material is effected through the area of contact of said ribbed portion due to relatively high inter-electrode capacity in that area while no substantial heating of other portions of said material is effected due to relatively low inter-electrode capacity throughout said other areas.

4. The electrode arrangement of claim 3 including a plurality of intermediate electrodes provided with ribbed portions of like configuration, said ribbed portions being maintained in registry between intermediate plies of thermoplastic work material.

5. An arrangement of electrodes for dielectric heating of thermoplastic material comprising a pair of spaced electrodes, a plurality of intermediate electrodes having ribbed portions, said electrodes being maintained in back-to-back relation intermediate plies of thermoplastic work material and insulated from said spaced electrodes by intervening plies of thermoplastic work material, the ribbed portions providing concentration of heat from high frequency energy applied to said spaced electrodes to the work material intermediate each of said ribbed portions and the opposed electrode of said spaced pair.

TANKRED VON HAUTEVILLE.

References Cited in the file of this patent

UNITED STATES PATENTS

| Number | Name | Date |
|---|---|---|
| 2,307,344 | Zottu | Jan. 5, 1943 |
| 2,435,866 | Bilhuber | Feb. 10, 1948 |
| 2,449,318 | Pitman et al. | Sept. 14, 1948 |
| 2,458,563 | Collins | Jan. 11, 1949 |
| 2,459,260 | Brown | Jan. 18, 1949 |
| 2,477,313 | Quayle et al. | July 26, 1949 |
| 2,504,754 | Sweeney | Apr. 18, 1950 |
| 2,517,672 | Jenkins | Aug. 8, 1950 |
| 2,542,702 | Prow | Feb. 20, 1951 |
| 2,583,709 | Rykert | Jan. 29, 1952 |
| 2,589,777 | Collins | Mar. 18, 1952 |
| 2,590,562 | Nielsen | Mar. 25, 1952 |

FOREIGN PATENTS

| Number | Country | Date |
|---|---|---|
| 118,453 | Australia | May 11, 1944 |
| 574,657 | Great Britain | Jan. 15, 1946 |
| 594,781 | Great Britain | Nov. 19, 1947 |
| 599,023 | Great Britain | Mar. 3, 1948 |